(12) United States Patent
Bharadwaj et al.

(10) Patent No.: US 10,394,469 B2
(45) Date of Patent: Aug. 27, 2019

(54) DETECTING AND HANDLING SOLICITED IO TRAFFIC MICROBURSTS IN A FIBRE CHANNEL STORAGE AREA NETWORK

(71) Applicant: Cisco Technology, Inc., San Jose, CA (US)

(72) Inventors: Harsha Bharadwaj, Bangalore (IN); Edward D. Mazurek, Mebane, NC (US)

(73) Assignee: Cisco Technology, Inc., San Jose, CA (US)

( * ) Notice: Subject to any disclaimer, the term of this patent is extended or adjusted under 35 U.S.C. 154(b) by 159 days.

(21) Appl. No.: 15/670,263

(22) Filed: Aug. 7, 2017

(65) Prior Publication Data

US 2019/0042110 A1   Feb. 7, 2019

(51) Int. Cl.
| | |
|---|---|
| *G06F 3/06* | (2006.01) |
| *G06F 13/40* | (2006.01) |
| *G06F 13/42* | (2006.01) |
| *G06F 16/23* | (2019.01) |
| *G06N 20/00* | (2019.01) |

(52) U.S. Cl.
CPC .......... *G06F 3/0619* (2013.01); *G06F 3/067* (2013.01); *G06F 3/0665* (2013.01); *G06F 3/0689* (2013.01); *G06F 13/4022* (2013.01); *G06F 13/4291* (2013.01); *G06F 16/2322* (2019.01); *G06N 20/00* (2019.01)

(58) Field of Classification Search
CPC .. G06F 3/0619; G06F 16/2322; G06F 3/0665; G06F 3/067; G06F 3/0689; G06F 13/4022; G06F 13/4291; G06N 20/00
See application file for complete search history.

(56) References Cited

U.S. PATENT DOCUMENTS

| | | |
|---|---|---|
| 8,312,188 B1 | 11/2012 | White et al. |
| 9,270,580 B1 | 2/2016 | Abraham et al. |
| 9,565,110 B2 | 2/2017 | Mullendore et al. |

(Continued)

OTHER PUBLICATIONS

Cisco, "Monitor Microbursts on Cisco Nexus 5600 Platform and Cisco Nexus 6000 Series Switches White Paper," Oct. 2014 (Year: 2014).*

(Continued)

*Primary Examiner* — Tim T Vo
*Assistant Examiner* — Phuong H Dang
(74) *Attorney, Agent, or Firm* — Edell, Shapiro, & Finnan, LLC (57) ABSTRACT

A Fiber Channel (FC) or FC-over-Ethernet (FCoE) switch has ports to forward Input-Output (IO) requests, and service data transfers, between end devices in a storage area network. The switch receives at a port a time ordered sequence of IO requests for data transfers to be serviced by the port. Each IO request including a data length of the data transfer. The switch detects a microburst on the port for each IO request. To do this, the switch parses the IO request to retrieve the data length, determines a transfer time required to transfer the data length over the port, upon receiving a next IO request, determine whether a time interval between the IO request and the next IO request is less than the transfer time, and if the time interval is less than the transfer time, declaring a microburst on the port, otherwise not declaring a microburst.

20 Claims, 5 Drawing Sheets

(56) References Cited

U.S. PATENT DOCUMENTS

| | | |
|---|---|---|
| 2003/0185154 A1 | 10/2003 | Mullendore et al. |
| 2005/0108444 A1* | 5/2005 | Flauaus ............... H04L 41/0853 710/15 |
| 2011/0199924 A1* | 8/2011 | Breslin ............... H04L 43/0882 370/252 |
| 2012/0014253 A1* | 1/2012 | Rongong ................ H04L 49/35 370/235 |
| 2014/0164609 A1* | 6/2014 | Kay .................... H04L 63/1416 709/224 |
| 2014/0177455 A1* | 6/2014 | Astigarraga .......... H04W 24/06 370/252 |
| 2014/0241151 A1* | 8/2014 | Ossipov ................. H04L 47/12 370/230 |
| 2014/0269378 A1* | 9/2014 | Holbrook ................ H04L 47/30 370/252 |
| 2016/0342391 A1 | 11/2016 | Hathom et al. |
| 2017/0012851 A1* | 1/2017 | Teeter .................... H04L 43/16 |
| 2017/0093678 A1* | 3/2017 | Gnanasekaran .... G06F 13/4022 |
| 2017/0295583 A1* | 10/2017 | Kariya .................... H04L 43/16 |
| 2018/0034718 A1* | 2/2018 | Subramani .............. H04L 43/04 |
| 2018/0145906 A1* | 5/2018 | Yadav ..................... H04L 45/70 |

OTHER PUBLICATIONS

"Fibre Channel Protocol for SCSI", FCP REV 1.0, proposal for draft working document, American National Standard for Information Systems, Nov. 2, 1992, X3T9.2/92-182, Rev 002, 20 pages.

"Fibre Channel Protocol for SCSI", FCP REV 0, proposal for draft working document, American National Standard for Information Systems, Sep. 4, 1992, X3T9.2192-182, Rev 0, SCSI FC-4 Rev 1.1, 20 pages.

\* cited by examiner

DETECTING AND HANDLING SOLICITED IO TRAFFIC MICROBURSTS IN A FIBRE CHANNEL STORAGE AREA NETWORK

TECHNICAL FIELD

The present disclosure relates to detecting microbursts in a Fibre Channel and/or Fibre Channel over Ethernet based storage area network.

BACKGROUND

In a Fibre-Channel (FC) or FC-over-Ethernet (FCoE) storage area network (SAN), servers use Input-Output (IO) read and write requests to access storage arrays over FC/FCoE capable switches in a switch fabric. A data intensive IO request pattern from a server may cause a sudden, short-term traffic burst or spike (referred to as a "microburst") lasting several milliseconds or even less. As the rate of traffic being received at the switch (perhaps from more than one ingress port) exceeds the destination (egress) link rate, the ingress port(s) will buffer the ingress traffic. Once a finite amount of buffering has occurred, the receiving switch, by various mechanisms, will notify the adjacent transmitting device(s) (end device or switch) to curtail sending subsequent data until notified that the congestion situation has been reduced sufficiently to allow further ingress traffic. This results in network congestion across the switch fabric, which has negative consequences. Note that this can occur even if the end device requesting the data intensive IO request pattern is not itself restricting the flow of data to itself.

Conventional "slow drain" detection indications are absent at the end device because the end device itself is not restricting the traffic flow. However, significant ingress slow drain congestion indications are seen on the "upstream" ingress ports supplying the data. Consequently, ingress congestion is seen without any real egress congestion indications and the end devices causing this situation are not easily detected or identified. Without proper detection or identification, no remediation actions can be taken to reduce the impact.

DESCRIPTION OF EXAMPLE EMBODIMENTS

Overview

A Fibre Channel (FC) or FC-over-Ethernet (FCoE) switch includes ports to forward Input-Output (I) requests, and service data transfers, between end devices in a storage area network. The switch receives at a port a time ordered sequence of IO requests for data transfers to be serviced by the port. Each IO request includes a data length of the data transfer. The switch detects a microburst on the port for each IO request. To do this, the switch: parses the IO request to retrieve the data length; determines a transfer time required to transfer the data length over the port; upon receiving a next IO request, determines whether a time interval between the IO request and the next IO request is less than the transfer time; and, if the time interval is less than the transfer time, the switch declares that a microburst is detected on the port, otherwise the switch does not declare that a microburst is detected on the port. The switch computes a frequency of the microbursts detected on the port over time. When the frequency exceeds a threshold, the switch takes action to reduce an impact of the (microburst causing) port on the storage area network. The action taken may apply Congestion Isolation techniques to the port.

Example Embodiments

Figure 1:
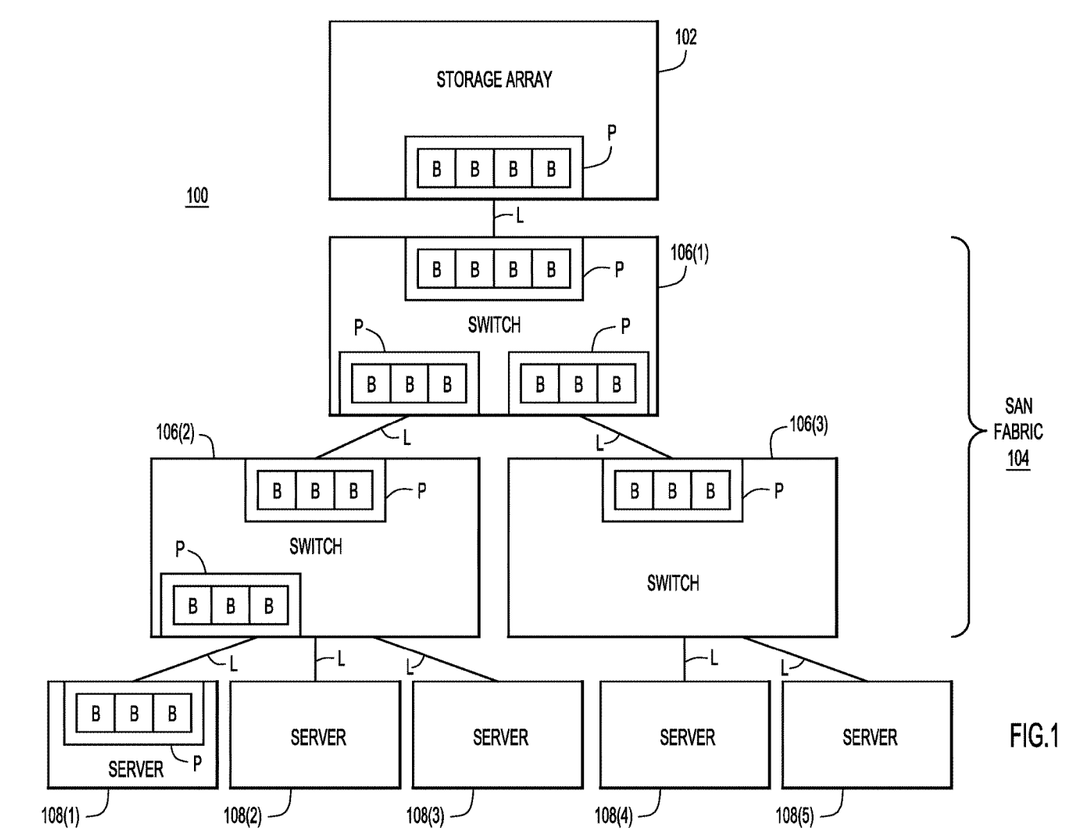
FIG. 1 is a block diagram of an FC (or FCoE) SAN in which embodiments directed to detecting and handling traffic microbursts may be implemented, according to an example embodiment.

Referring first to FIG. 1, there is shown a block diagram of an example FC SAN 100 in which embodiments directed to detecting and handling traffic microbursts may be implemented. Network 100 includes a storage array/device 102 for storing large volumes of data, an FC SAN fabric 104 including interconnected FC or FCoE switch devices 106(1)-106(3) (referred to collectively as "switches 106," and individually as a "switch 106"), and servers 108(1)-108(5) (referred to collectively as "servers 108," and a "server 108") to host applications that access the data stored on the storage array over the SAN fabric. Storage array 102 and servers 108 are also referred to as "end devices" that communicate with each other over SAN fabric 104. Storage array 102 includes multiple storage array ports, switches 106 each includes multiple switch ports, and servers 108 each include multiple server ports, respectively. The aforementioned ports, labeled "P" in FIG. 1, may be FC or FCoE ports. It is understood that storage array 102, each switch 106, and each server 108 may include many more ports P than are shown in FIG. 1.

Each of ports P may be associated with one or more buffers B for buffering data received, or to be transmitted, by the port associated with the one or more buffers. Such buffering may be used to support flow control in IO data transfers from and to each port P. Storage array 102, switches 106, and servers 108 connect to, and communicate with, each other over various FC links L connected between various ones of the ports P of the storage array, switches, and servers, as shown by way of example in FIG. 1. An FC link between switches 106 is referred to as an "inter-switch link" (ISL) and switch ports on the ISL are referred to as "ISL ports." It is understood that FC SAN 100 may include any number of storage arrays, switches, and servers, and that FIG. 1 is only an example.

Storage array 102, switches 106, and servers 108 may exchange FC frames with each other over FC links L. The FC frames may be formatted in accordance with an upper layer protocol, such as the FC Protocol (FCP) for Small Computer System Interface (SCSI) (referred to as "FCP"). The FCP packages various SCSI IO commands or requests into FC frames. The SCSI IO commands/requests including SCSI Read/Write/Transfer Ready (XFR_RDY). The FCP also packages into FC frames SCSI data transferred pursuant to the SCSI IO requests.

Servers 108 (referred to as SCSI "initiators") host applications that access storage array 102 (referred to as an SCSI "target") through SAN fabric 104 to satisfy the IO needs of the applications. The server applications can generate thousands of IO requests every second to satisfy these needs. Servers 108 send the IO requests to storage array 102 through SAN fabric 104 and, in response, large volumes of data may be transferred back from the storage array to the servers, through the SAN fabric, within a short duration of time, e.g., in millisecond and even sub-millisecond, time frames. This results in sudden bursts of traffic through SAN fabric 104. The sudden bursts are referred to as "traffic microbursts" or simply "microbursts." Switches 106, which facilitate the data transfers, may be required to absorb the bursts of traffic from the end devices (e.g., storage array 102 and servers 108) with internal buffering and a buffer availability based crediting mechanism on switch port buffers B due to a "no-drop" requirement of FC SAN 100.

Generally, servers 108 initiate IO operations and subsequently the servers and storage array 102 transfer data to one another (e.g., storage array to server in case of Read and server to storage array in case of Write). Specifically, when an end device initiates an IO operation in FC SAN 100, an "Exchange" starts in which an upper layer protocol (e.g., the FCP) in the end device divides a record containing data from an upper layer protocol information unit (IU) (e.g., an FCP IU) into multiple data-carrying FC frames. Each FC frame has a fixed maximum size of 2084 bytes (B) (4B SOF+24B FC header+2048B payload+4B Cyclic Redundancy Code (CRC)+4B End of Frame (EOF), ignoring a seldom used 64B optional header). FCoE encapsulates FC frames within Ethernet as defined by the FCoE frame format, and the resulting frames are larger than FC frames. The multiple data-carrying FC frames are transmitted through SAN fabric 104 in the context of the Exchange and then reassembled at a destination end device (at the other end of the SAN fabric) to recreate a complete record of the upper layer protocol IU for delivery to the upper layer (e.g., the FCP).

In the context of an FC frame transfer between ports P connected to each other over an FC link, a Buffer 2 Buffer (B2B) credit on a port equals a buffer capacity to hold one FC frame, irrespective of the size of the FC frame. A fundamental characteristic of the FC link is that it creates a lossless network by implementing a flow control scheme using the concept of buffer credits. Every switch port maintains B2B accounting and thereby perform a flow control in a hop-by-hop fashion. The B2B value is an agreed upon value between a pair of directly connected ports P and controls the buffer management in the IO path through SAN fabric 104. A transmitting port P uses its available credit/buffers and waits to have its buffers/credits replenished by the receiving port P at the other end of the link. The amount of data seen on a port P of a switch 106 (i.e., a "switch port") depends on the negotiated B2B value, a link speed, a size or length of the data being/to be transferred in the IO operation, and a time interval between consecutive IO operations referred to as an inter-IO gap (IIG). By tuning these parameters optimal and reliable performance from FC network 100 can be expected.

The FCP is now described briefly. The FCP is a transaction oriented protocol in which every SCSI IO operation (i.e., SCSI Read/SCSI Write/XFR_RDY) is mapped to an exchange of FC frames each formatted according to the FCP. Types of FCP frames include, but are not limited to:

a. An FCP_CMD IU frame including a control field to indicate the frame represents a SCSI Read or a SCSI Write;

b. An FCP IU frame that indicates a SCSI Transfer Ready (XFR_RDY); and c. An FCP Data IU frame to carry data responsive to a corresponding SCSI Read/Write/XFR_RDY.

An FC header of the above FCP frames each include fields to indicate a destination identifier (DID) and a source identifier (SID). The DID and SID respectively identify the destination device for the current FC frame and the source device that originated the current FC frame. The FCP frames include further fields described below.

Every SCSI IO operation is a solicited operation typically initiated by servers 108. Every SCSI Read/Write operation begins with an FCP_CMD IU frame, including the SCSI Read/Write indication (i.e., a SCSI Write FCP_CMD IU frame or a SCSI Read FCP_CMD IU frame). The FCP_CMD IU frame also includes an "FCP_DL" field that indicates a maximum number of all bytes to be transferred to/from an application client buffer in "FCP_DATA IU frames" that follow the FCP_CMD IU frame.

The SCSI Writes are usually performed in a staged manner in which an initiator initially sends to a target an SCSI Write FCP_CMD IU frame (also referred to as a "write request"). The target can respond with the FCP IU frame that indicates an SCSI XFER_RDY. The SCSI XFR_RDY includes an FCP_BURST_LEN field indicating an amount of data the target is ready to receive in a next FCP DATA IU frame from the initiator. Responsive to the SCSI XFR_RDY, the initiator sends the FCP DATA IU frame carrying appropriately sized data. The sum of the FCP_BURST_LENs of all of the XFER_RDYs sent in the exchange should not exceed the FCP_DL value in the initial write request. Using this mechanism the target can indicate to the initiator to complete the write in stages with the initiator sending only BURST_LEN worth of data after each XFER_RDY received from the target.

In contrast, SCSI Reads are by nature not as "controlled" as SCSI Writes. An initiator initially sends to a target a SCSI Read FCP_CMD IU frame (also referred to as a "read request"), and the target responds with FCP DATA IUs until all of the requested data has been sent. There is no XFR_RDY mechanism for the initiator to limit the amount of data the target sends back. For example, for one read operation initiated by a server 108, storage array 102 essentially streams the total amount of data (indicated by FCP_DL in the read request) requested to the server.

FC-over-Ethernet (FCoE) is an encapsulation method to use Ethernet transport for FC frames. While all IO transfer techniques for FCoE are the same as those for FC (e.g., FCP), frame formats and flow control methods are different. While the encapsulated frame format results in a maximum 2220 byte frame, the flow control mechanism used is the Per-Priority Pause.

Bursts of the above above-described IO operations exchanged between end devices 102 and 108 may result in traffic microbursts in SAN fabric 104. Traffic microbursts arise for several reasons. There may be a speed mismatch between a server port P (on a server 108) operating at 2 Gigabits/second ("2 G") and a corresponding storage port P (on storage array 102) operating at 16 G. In that case, IO read requests sent from the 2 G server port are serviced by the storage port at 8 times the drain capacity of the server port. There may be a busy/rogue application on a server 108 generating a high amount of server IO data traffic toward the storage port. There may be traffic "incast" patterns that cause IO requests from multiple servers 108 to converge onto storage device 102 at the same time making the storage port heavily oversubscribed, e.g., a high fan-in storage-server ratio of greater than 1:20. A majority of the traffic microburst cases arise from one of servers 108 being overwhelmed by large chunks of data from storage device 102 in response to SCSI Reads. SCSI Reads by nature are only controlled by the total size (FCP_DL) of the requested data. Therefore, a large amount of data can be included in a data burst directed to a server 108 because switch ports (on switches 106) and storage ports (on storage array 102) usually operate at higher link speeds than the server ports (on servers 108). This results in the server link not having enough capacity to handle the amount of incoming traffic coming, which causes switch port buffers to fill with data from storage array 102 much more quickly than servers 108 drain the switch port buffers.

Congestion due to traffic microbursts can cause problems in FC SAN 100. For example: a congested port on an end device, e.g., a server or a storage array, may cause an application hosted on the end device to bog-down; the congestion may result in buffer exhaustion on a core switch port that is transferring data between end devices; the congestion can cause a congestion ripple effect on a cascade of switch ports between the end devices due to the "no-drop" nature of the FC SAN; and the congestion introduces high latency and jitter in the traffic between the end devices, resulting in unpredictability in network performance, threatening the reliability of the SAN as a whole.

Accordingly, embodiments presented herein detect the above-described traffic microbursts, determine a frequency of the detected microbursts, determine whether the frequency is indicative of excessive microburst activity, and, if the microburst activity is deemed excessive, take action to reduce the microburst activity. The embodiments may be implemented wholly or partly in FC switches 106, which are uniquely positioned, between end devices 102 and 108, to detect and assist in controlling the microbursts. It is understood that the techniques presented herein for detecting and handling microburst in the context of FC, FC switches, and FC switch ports apply equally to FCoE, FCoE switches, and FCoE switch ports.

Figure 2:
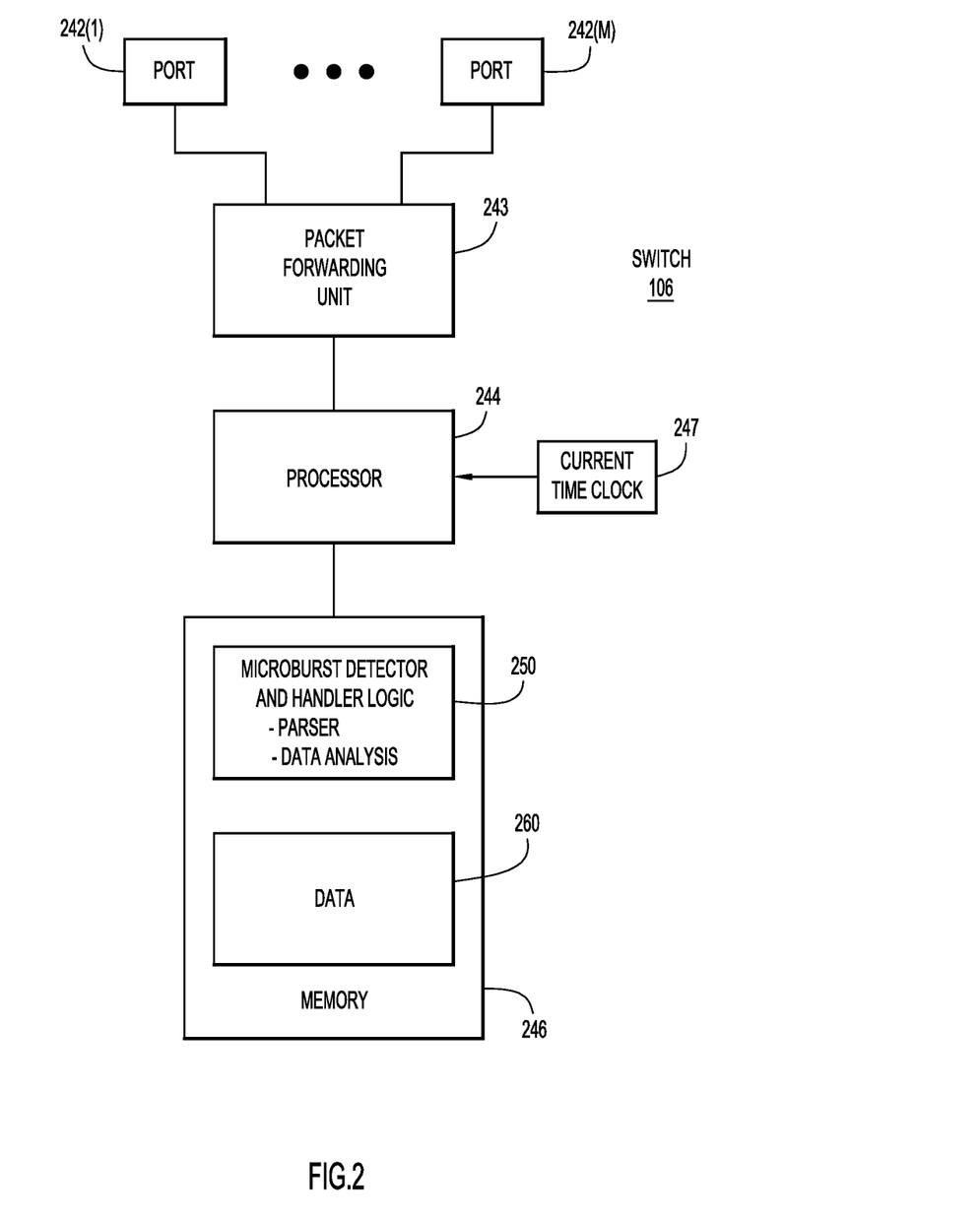
FIG. 2 is a block diagram of an FC switch of the FC SAN configured to detect and handle the traffic microbursts, according to an example embodiment.

With reference to FIG. 2, there is a block diagram of an FC or FCoE switch 106 configured to detect and handle the traffic microbursts. Switch 106 comprises a plurality of FC or FCoE ports 242(1)-242(M) to send FC frames/packets to a network and receive FC frames/packets to the network, a packet forwarding/processing unit 243, a network processor 244 (also referred to simply as "processor"), a memory 246, and a current time clock 247 configured to provide sub-millisecond time stamps (i.e., time stamps with microsecond resolution) to the ports and/or the network processor for the FC frames/packets received on ports 242(1)-242(M). The packet forwarding/processing unit 243 is, for example, one or more application specific integrated circuits that include buffers, queues, and other control logic for performing packet forwarding operations. The processor 244 is a microcontroller or microprocessor that is configured to perform higher level controls of switch 106. To this end, the memory 246 stores software instructions that, when executed by the processor 244, cause the processor 244 to perform a variety of operations including operations described herein. For example, the memory 246 stores instructions for microburst detector and handler logic 250 to perform methods 400 and 500, and other operations described herein. Microburst logic 250 may include an analytics engine and a parser. Memory 246 also stores data 260 used and generated by logic 250. Such data includes inter-IO gaps, SIDs, DIDs, detected microburst counts and frequencies, and predetermined threshold frequencies, as described below.

Memory 246 may comprise read only memory (ROM), random access memory (RAM), magnetic disk storage media devices, optical storage media devices, flash memory devices, electrical, optical, or other physical/tangible memory storage devices. Thus, in general, the memory 246 may comprise one or more tangible (e.g., non-transitory) computer readable storage media (e.g., a memory device) encoded with software comprising computer executable instructions and when the software is executed (by the processor 244) it is operable to perform the operations described herein in connection with logic 250.

Techniques for detecting and handling traffic microbursts are now described. One limited approach attempts to solve problems associated with traffic microbursts in SAN fabric 104 using deep buffers, i.e., increasing the numbers and sizes of buffers B associated with each of ports P on switches 106; however, solving the problems associated with microbursts using deep buffers is not a credible option for FC/FCoE networks. This is because no amount of buffers will qualify as "deep enough" with a guarantee of meeting the no-drop requirement and ensuring congestion is not reflected back to the sender.

Identifying end devices that originate the IO requests that are most likely to cause traffic spikes and congestion is a helpful first step in a solution that identifies/detects microbursts and solves problems associated with the microbursts using end device quarantine techniques like "Congestion Isolation" (which slows down the return of B2B credits, and thus a drain rate, between ports exchanging data by isolating the traffic to a separate logical link in the fabric) may be applied to ports of the identified end devices, which ensures that the impact on FC SAN 100 caused by these end devices is contained. Unfortunately, due to the sub-millisecond time frames between IO requests and resulting microbursts, identifying the end devices and detecting the IO patterns (i.e., sequences of IO requests) that cause the microbursts is challenging. This is because when a network IO traffic pattern is measured as an overall bandwidth average over a few minutes (or even few seconds) duration, it may seem normal; however over a small millisecond or sub-millisecond duration, the IO traffic pattern (which may include many closely spaced, or a high frequency, of IO requests) may have caused or will cause a maximum negative impact in FC SAN 100. Conventional switch port interface metrics like average throughput (in Megabits per second (Mbps)) or buffer occupancy (B2B counters) miss these micro-spikes in the traffic, since the averaging operation tends to hide the spikes. Some switches employ a BBZ counter on the feeding ISL (core) port to identify these conditions on the edge port. However the BBZ counter cannot distinguish between a microburst like situation that causes instantaneous buffer exhaustion vs. a genuine slow end device causing a gradual buildup of buffers on the ISL port. The BBZ counter, and the throughput and B2B counters, also cannot identify specific end device pairs (SID, DID), types of IO (Read/Write/XFR_RDY), and a high-resolution timestamp of the microbursts. Identification of the of occurrence of IO patterns that causes microbursts and then attributing it to specific end device pairs can help in flagging a potential offending end device. Moreover it may be advantageous to be able to identify the possibility of occurrence of these microbursts well in advance of the actual data transfers that will overload buffers on the ISLs and saturate the edge links.

Techniques presented herein to identify and solve problems associated with microbursts take advantage of the ability of each switch 106 to measure IO activity (e.g., IO Reads/Writes/XFR_RDYs) on a per port basis at a submillisecond time granularity, and thus overcome the above-mentioned challenges. As indicated earlier, each IO operation (e.g., Read/Write/XFR_RDY) in FC SAN 100 represents a forecast of an upcoming data transfer of a known data size, i.e., for every IO operation there is a prior knowledge of the amount of data/frames that will be sent or received in the near future as a result of the IO operation. The techniques presented herein intercept the data solicitation requests of the IO operation (Read/Write/XFR_RDY) passing through the switch ports, from which the amount of data in the DATA_IU that is expected to be sent in response can be accurately determined. This ability to calculate the volume of data expected at a switch port in advance of the actual transfer of data can be used to predict the occurrence of IO spikes (i.e., microbursts).

Switches 106 each include, for example, a Switch Port Analyzer (SPAN) port capability in which packets traversing ports of the switch may be copied to network processor 244 of the switch (usually present on line cards of the switch) and analyzed to implement what is referred to as a packet SPAN capability. To perform packet SPAN, the switch 106 may use access control list (ACL) rules/filters, which redirect packets at the switch ports that match the rules to network processor 244. All data solicitation requests (Read/Write/XFR_RDY) packaged in intercepted FCP frames are sent to network processor 244 where SCSI headers of Read/Write/XFR_RDY can be parsed and the data length of every corresponding IO can be calculated. Network processor 244 is clocked at nanosecond timeframes/frequency and thus can accurately determine an amount of time between two consecutive IO requests (i.e., accurately determined the IIG). Typically, such measurements are made on edge ports of the switch connected to server ports or storage ports since that is where accurate IIG can be determined.

After establishing each FC link L, the link speed and B2B values for the link are usually constant, but the IO size (i.e., data size to be transferred) and IIG vary depending on the IO request patterns generated by the needs of applications on the end devices 102 and 108. By measuring these variable parameters (e.g., IO size and IIG) dynamically for each IO request intercepted at switch 106 and then comparing the measurements against the speed of the switch ports used to handle the IO request, i.e., transfer the data responsive to the IO requests, the switch can (i) calculate the amount of data that will follow the IO requests in response to the IO requests, and (ii) determine whether an end device (e.g., one of servers 108) is requesting more data than the switch and requesting end device can handle given its current link speed, resulting in a microburst condition. The identification of microbursts can happen in real-time in network processor 244 because every IO passing through the switch ports is captured/intercepted and analyzed. Qualification of an IO pattern as a microburst occurs when the amount of data expected to be generated in response to a series of closely spaced IO request exceeds a transmit capacity of the switch port in a predetermined time interval. Upon detecting these IO patterns, network processor 244 notifies a supervisor application (computer software) of the frequency of occurrence of these microbursts and the end devices causing the microbursts. The supervisor application compares the frequency of microbursts against predetermined acceptable microburst occurrence thresholds. This information can also be streamed to an external data platform, where a fabric wide view of microbursts causing end devices may be identified.

The following is an example algorithm, including computations, which can be used by network processor 244 to determine a microburst event on a port P of one switches 106. IO0, IO1, IO2 identify IO requests received at the port P at respective times (t0, t1, t2, etc.):

For the FCP_CMD IU of IO1 with SID=S1:
a. Data-Size=FCP_DL (for Read) or BURST_LEN (for XFR_RDY). Data-Size (bytes)/2048 (FC payload size)=X data frames.
b. X*2084 byte (max size FC frame including headers)=Y bytes.
c. Y*10 bits/byte (FC 8b/10b encoding)=Z bits, on wire (FC link L).
d. Z bits/Port Speed in bps=T, time to drain forecasted data for IO1 from port P.
   i. If ((t1−t0)<T) {where t1−t0=IIG between IO1 and IO0, then declare link saturation on the port (i.e., link saturation on port P)++ for SID=S1—i.e., increment count of microbursts for port P}.

For example, on an 8 G server port:
a. A SCSI Read with a FCP_DL=0x40000 bytes would generate 128*2048 byte FCP_DATA packets.
b. 128*2084=266752 bytes*10 bits/byte=2667520 bits.
c. 2667520 bits/8,500,000,000 bits/sec=313 us.

So if the IIG with the previous consecutive Read IO measured on the port is <313 microsecond, then a microburst situation is likely to occur towards this server port.

Similarly a storage device receiving closely spaced SCSI Writes from different servers will cause an identical scenario if the resulting XFR_RDYs and their respective BURST_LENs are sent to quickly The above-algorithm can be suitably adapted for FCoE networks by changing the maximum size FC frame, Port Speed, and assuming no byte encoding on wire.

Each switch 106 executes the above algorithm repeatedly on each port P of the switch to identify microbursts per port. A threshold frequency of microbursts per port may be defined. The threshold frequency is a predetermined maximum number of microbursts that can occur on the port P in a given time interval. Upon exceeding the threshold frequency on a port P, the switch may introduce remedial actions on the switch and/or end device causing the threshold frequency to be device can be exceeded. For example, if the switch identifies a microburst pattern that has exceeded the threshold frequency on a port, the network processor can lookup/identify the SID of the server, or the {SID, Virtual Machine ID (VMID)} tuple of a virtual server as included in the FC frame containing an IO request, causing the microburst condition. For a given edge port (connected to servers), the server SID or {SID, VMID} and the corresponding storage port DID and its Logical Unit Numbers (LUNs) whose request is causing excessive IOs can also be identified. For the microbursts identified on a storage device port and if no specific set of problematic servers can be identified, it could be the case of too many servers being mapped to a single storage port. Even for such cases it may make sense to take recovery actions on the storage device while the admin fixes the storage to server mapping ratio.

Another variation of this mechanism would be to collect data from the switch edge ports to obtain trends of (IIG, IO-Size) in Ingress vs. a link saturation (i.e. microburst) condition causing exceeding of drain rate of a port in Egress. In other words trending of the ingressing IO patterns vs. Egress link saturation condition. This data, on a per port, per FC link basis, can be used to train a machine learning (ML) algorithm and build models. After the training phase, the metrics IIG, IO-Size on per port, per FC link can be fed to the model to identify IO patterns on the port that are likely to cause link saturation conditions. The model can also help predict when these conditions are likely to occur in the future. A basic linear regression based ML algorithm is deemed sufficient.

Figure 3:
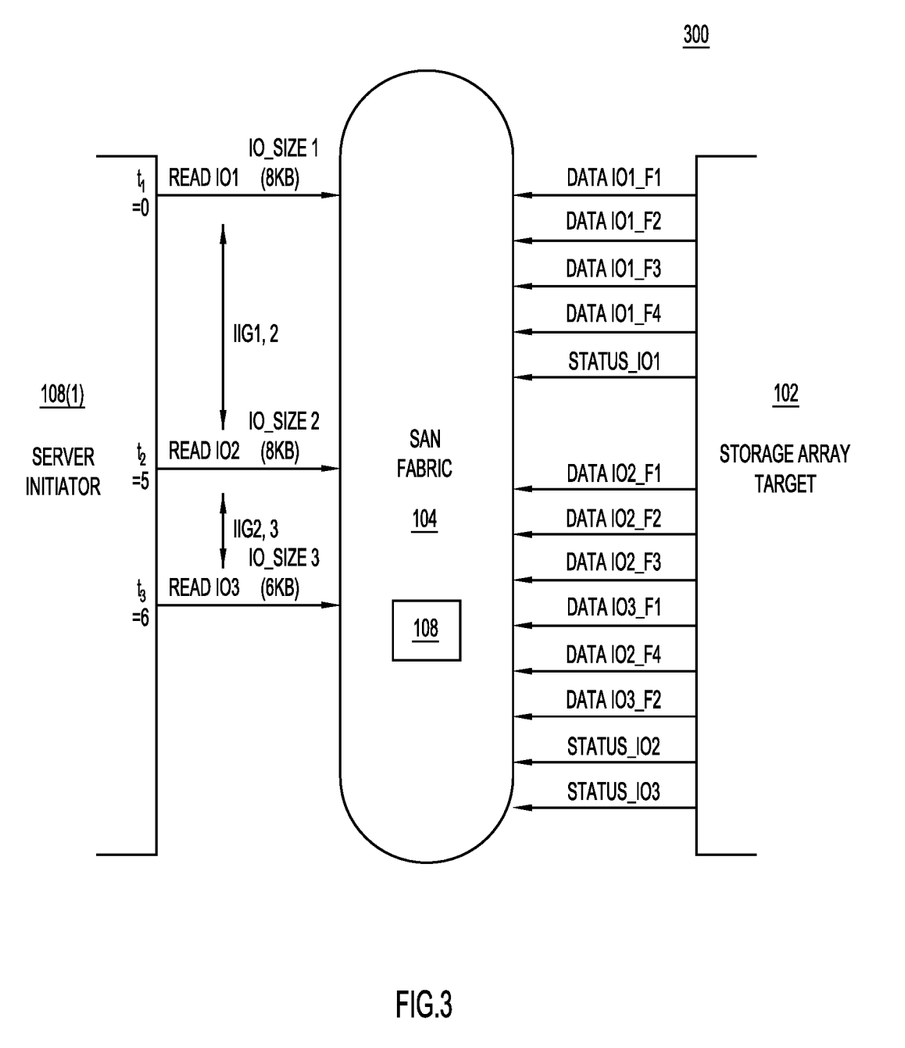
FIG. 3 is a flow diagram for Read IO operations between a server and a storage array through a switch fabric of the FC SAN, according to an example embodiment.

With reference to FIG. 3, there is a diagram of an example Read IO flow 300 that shows Read IO operations flowing between a port of server 108(1) (the initiator) and storage array 102 (the target) through a switch of SAN fabric 104. In the flow 300, server 108(1) sends to storage array 102 a sequence of time ordered Read IO requests ReadIO1, ReadIO2, and ReadIO3 requesting respective data sizes/lengths IO-Size1 (e.g., 8 KB), IO-Size2 (8 KB), and IO-Size3 (e.g., 6 KB) at respective increasing times t1=0, t2=5, and t3=6, expressed in time units. The times t1, t2, and t3 establish inter arrival time periods:

a. IIG1,2=t2−t1=5; and
b. IIG2,3=t3−t2=1.

In response to ReadIO1, ReadIO1, and ReadIO3, storage array 102 sends to server 108(1), respectively:

a. 4 data frames/packets Data IO1-F1-Data IO1-F4;
b. 4 data frames/packets Data IO2-F1-Data IO2-F4; and
c. 2 data frames/packets Data IO3-F1-Data IO3-F2, which are interleaved with the 4 data frames/packets Data IO2-F1-Data IO2-F4.

Assume a packet drain rate on the server port is 1 frame per unit of time.

a. IIG1,2=5 units, which will not cause link saturation or buffering on the port) because the 5 unit drain time is sufficient to drain all 4 frames/packets responding to ReadIO1.
b. However, IIG2,3=1 unit, during which time only 1 frame/packet of IO2 would have drained. So, at time t3, a link saturation counter (also referred to as a microburst counter) counter is incremented.

Figure 4:
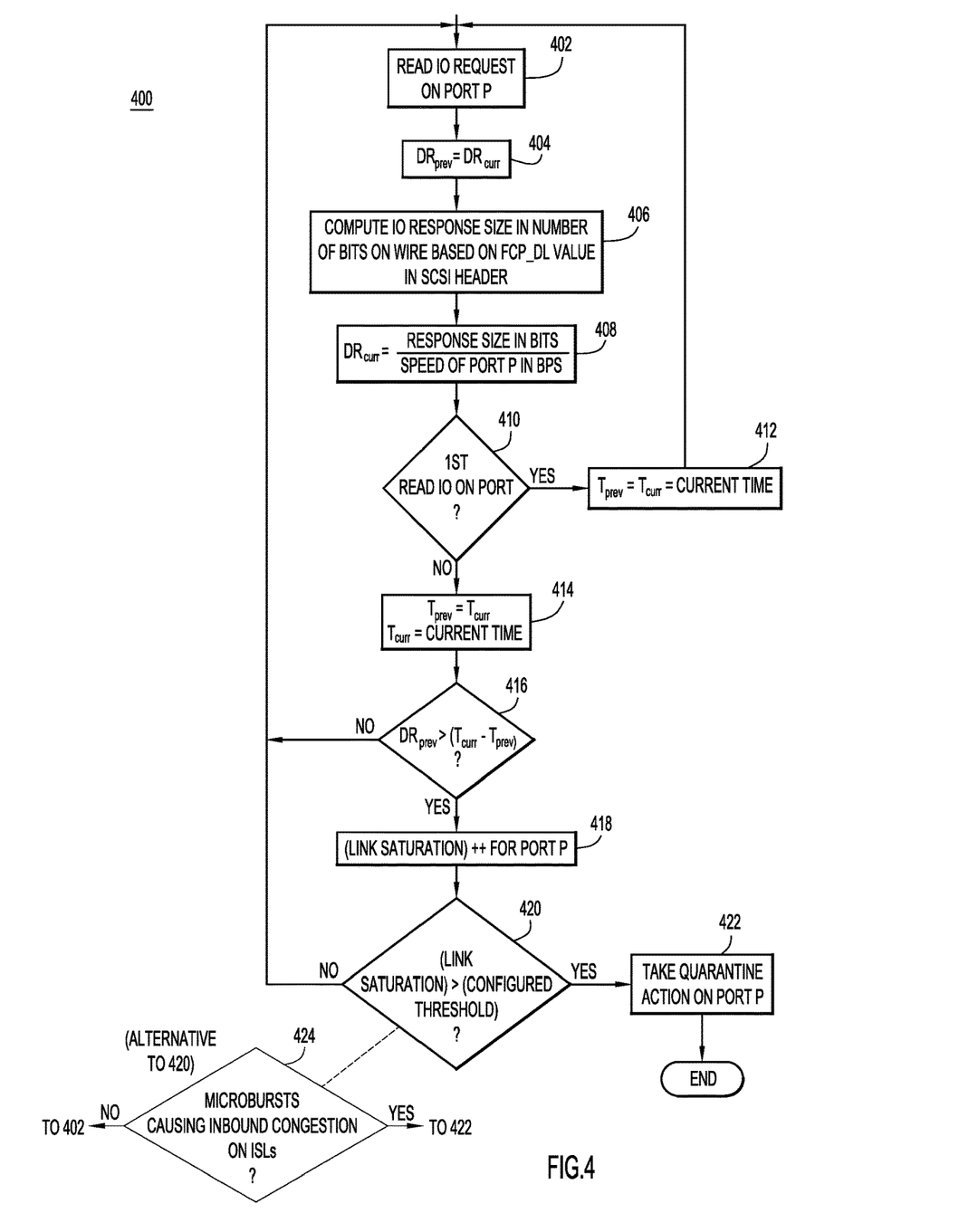
FIG. 4 is a flowchart of a method of detecting possible microburst conditions on a switch port of an FC switch caused by Read IOs, performed by the FC switch, according to an example embodiment.

With reference to FIG. 4, there is a flowchart of an example method 400 of detecting possible microburst conditions on a port of a switch 106 caused by Read IOs (also referred to as IO Reads or IO Read requests) on the port. The computational operations of method 400 may be performed primarily by network processor 244 of switch 106.

At 402, the port receives a Read IO.

At 404, the network processor sets a previous time to drain the port $DR_{prev}$ (referred to as previous drain time $DR_{prev}$) equal to a current drain time $DR_{curr}$.

At 406, the network processor parses the Read IO to retrieve the FCP_DL field the requested/forecasted data length, and computes an IO response size in number of bits on the wire based on the data length.

At 408, the network processor computes a new current drain time $DR_{curr}$ as follows:

$DR_{Curr}$=IO response size in bits/speed of port in bps.

At 410, the network processor determines whether this is a first Read IO on the port. If yes, flow proceeds to 412, where the network processor sets both a previous time stamp $T_{prev}$ and a current time stamp $T_{curr}$ equal to a current time, and flow proceeds back to 402. If this is not the first Read IO on the port (meaning that there are previous IO reads on the port), flow proceeds to 414.

At 414, the network processor sets previous time stamp $T_{prev}$ equal to a current time stamp $T_{curr}$, and $T_{curr}$ equal to the current time. The effect of this is to establish two time stamps $T_{prev}$ and $T_{prev}$ for the previous IO read and the current IO read, respectively.

At 416, the network processor determines whether $DR_{prev}>T_{curr}-T_{prev}$ (i.e., whether the drain time is greater than the time interval referred to as the IIG, meaning that the port will not be able to transfer the amount of data requested by the immediately preceding Read IO fast enough—before an arrival of its next consecutive IO request). If $DR_{prev}>T_{curr}-T_{prev}$ is not true, the port will be able to transfer the amount of data before the next consecutive Read IO, and flow proceeds back to 402. If $DR_{prev}>T_{curr}-T_{prev}$ is true, the port will not be able to transfer the amount of data before the next consecutive IO Read, meaning there is a microburst event, and flow proceeds to 418.

At 418, the network processor increments a link saturation counter (also referred to as a "microburst counter" for the port.

At 420, the network processor computes a frequency of microbursts as the number of microbursts (as indicated in the link saturation/microburst counter) accumulated over a given time period. The network processor determines whether the frequency exceeds a predetermined threshold frequency indicative of excessive microburst activity. If the frequency does not exceed the threshold, flow proceeds back 402. If the frequency exceeds the threshold, flow proceeds to 422.

At 422, the network processor takes remedial action on the port to prevent a future occurrence of excessive microburst activity on the port. Remedial actions may include sending a notification of the excessive microburst activity, or adjusting a Quality of Service (QoS) provided on the port.

The above method is executed repeatedly for all of the ports of the switch (e.g., all edge F_ports of switch 106). The predetermined threshold frequency can be defined independently for each port, so that different thresholds apply to different ports.

Optionally, as an alternative to/replacement of operation 420, at 424 the network processor determines if the frequency of microbursts is also causing inbound congestion on ISLs (or target ports in the same switch). To do this, the network processor checks a receive transitions to zero B2B counter (for FC) or transmit priority flow control (PFC) pauses (for FCoE) on the upstream ISLs or storage ports. If there is no inbound congestion seen based on the checks, then the frequency of microbursts is not causing any upstream congestion and are thus microbursts are not significant, and flow proceeds back to 402, otherwise flow proceeds to 422.

Remedial actions to be taken to insulate the FC network 100 from microburst causing end devices can be driven by a user defined policy. Policies like "Congestion Isolation" or "Manual Administrator Intervention" can be defined on a per port basis. Congestion Isolation is an existing mechanism used in slow drain situations where devices in the quarantine list are classified into a low priority lane in the network, thereby insulating the entire network from degradation. Manual intervention policy is an alerting mechanism that relies on the server administrator to make intelligent tuning of devices identified by the algorithm. End device tuning may include changing parameters like I/O operations per second (IOPS) of an application hosted on the end device to smoothen out the IO spikes, queue depth of a host bus adapter (HBA) on a switch port, increasing B2B buffers available on the HBA/switch port, adding additional HBAs or converged network adapters (CNAs), and so on. A SAN administrator could enable switch features like B2B extension on the ISL port, which allows an increase in buffering on a port by consuming buffers from an adjoining port, creating deeper buffers that can temporarily offset the impact of the IO spikes. For a storage device actions might include a storage administrator redistributing LUNs across the storage ports, migrating LUNs, IOPS rate-limiting, and so on.

Figure 5:
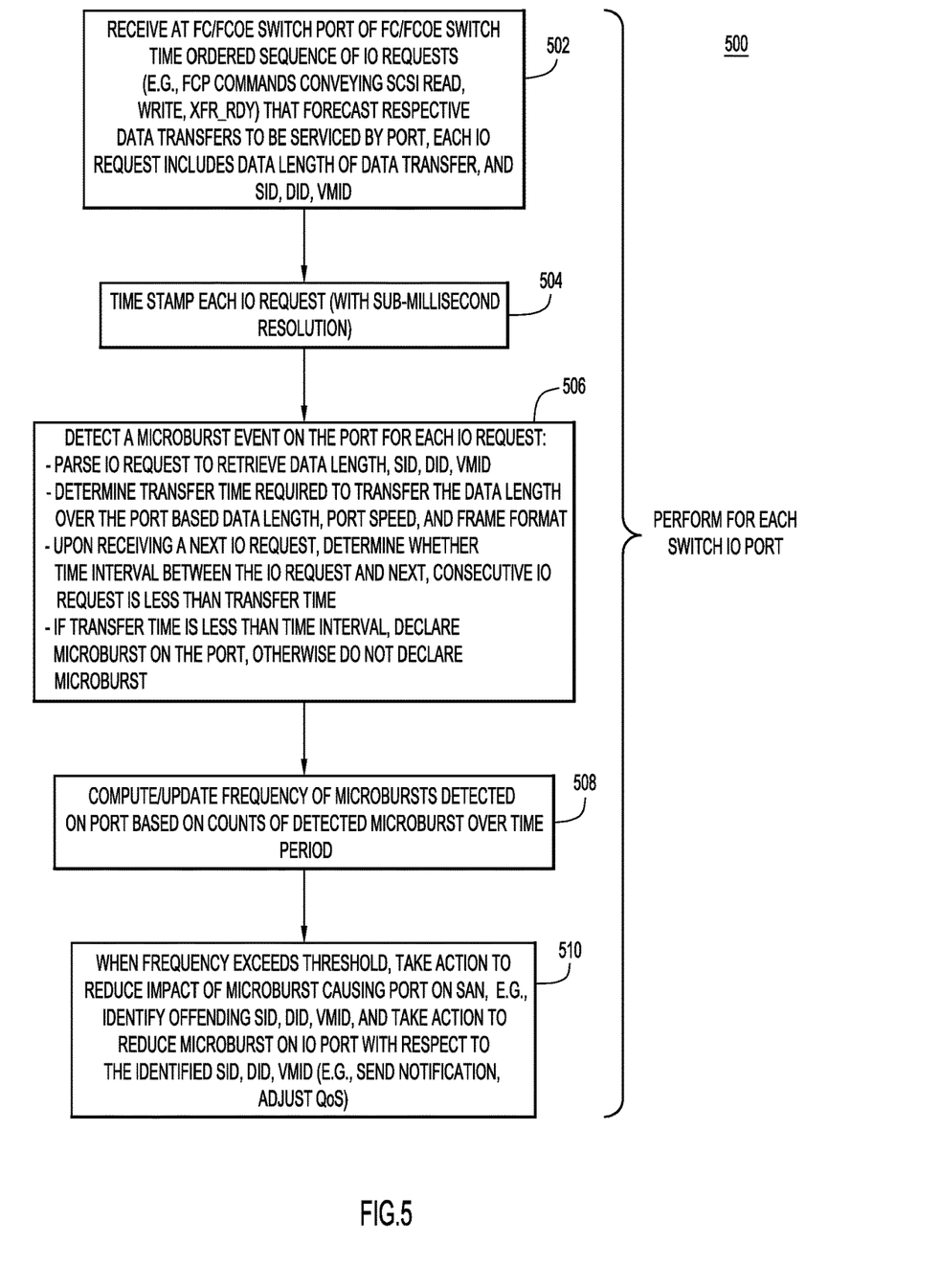
FIG. 5 is a flowchart of a method of detecting possible microburst conditions on a switch port of an FC switch caused by IO requests, performed by the FC switch, according to an example embodiment.

With reference to FIG. 5, there is a flowchart of a generalized method 500 of detecting and handling microbursts caused by IO requests, performed by FC or FCoE switch 106, which has FC or FCoE switch ports P ("ports") that communicate with end devices 108 and 102 in FC SAN 100. The ports forward IO requests and service data transfers resulting from the IO requests between end devices 108 and 102 in FC SAN 100. Method 500 includes operations described above.

At 502, switch 106 receives at a port of the switch a time ordered sequence of IO requests that forecast respective, upcoming data transfers to be serviced by the port. Each IO request respectively includes a data length of the forecasted data transfer, and identifiers for a source device (SID) and a destination device (DID) for the data transfer, and possibly a VMID. Example IO requests include FCP commands conveying SCSI Read, Write, and XFR_RDY.

At 504, switch 106 time stamps each IO request with an incrementally increasing current time.

At 506, switch 106 detects a possible microburst (link saturation) on the port with respect to each IO request. To do this, switch 106 performs the following processing on/for each of the IO requests:
  a. Parses fields in the IO request to retrieve a data length for the data transfer forecasted by the IO request, an SID, a DID, and possibly a VMID, and store the retrieved fields;
  b. Determines a transfer time needed/required to transfer the entire data length over the port based on the data length, a known speed/data rate of the port (or link to which the port is connected), and a specified frame format (e.g., FCP or FCoE) of frames into which the data length will be packed for transfer over the port. In one example, this includes converting the data length as specified in bytes to a corresponding number of bits to be transferred using the specified frame format (which specifies overhead bits, for example), and dividing the number of bits by the port speed in bits per second, to produce the transfer time;
  c. Upon receiving a next consecutive IO request, determines a time interval or IIG between the IO request and the next, consecutive IO request based on the respective time stamps of the two requests (e.g., by subtracting the later time stamp from the earlier time stamp);
  d. Determines whether the time interval (IIG) is less than the transfer time (or, conversely, that the transfer time is greater than the time interval);
  e. If the time interval is less than the transfer time, declares a microburst (i.e., a microburst event) for the port and increments a link saturation/microburst counter for the port. If the transfer time is not less than the time interval, the switch does not increment the counter.

Switch 106 typically performs operation 506 in advance of actually transferring any of the data length for the IO request.

At 508, switch 106 computes (or updates) a frequency of the microbursts detected on the port using the value of the microburst counter as accumulated over a given time period.

At 510, switch 106 determines whether the frequency exceeds a predetermined threshold frequency indicative of excessive microburst activity. If/when the threshold frequency is exceeded, the switch takes action to reduce an impact of the (microburst causing) port in SAN 100, i.e., the switch takes action with respect to the port to reduce the impact of the microbursts. For example, switch 106 identifies which end devices (e.g., which SID, DID, and VMID) are associated with/caused the microburst activity on the port based on the recovered fields stored at operation 506(a), and takes action to reduce a likelihood of microbursts on the port. Examples of action that may be taken include (i) sending an alert message to an administrator portal indicating the threshold was exceeded and listing the identified end device(s) (e.g., SID, DID, VMID) that caused the frequency to exceed the threshold, and (ii) reducing a Quality of Service (QoS), from a first QoS value to a second QoS value that is less than the first QoS value, on the port with respect to IO requests originated from the identified source device.

It is understood that switch 106 receives a respective sequence of IO requests on each of multiple ports of the switch. Switch 106 performs method 500 for each port. Thus, switch 106 maintains the following statistics on a per port basis: instances and numbers of IO Reads and Writes, IIGs, microburst count, times the frequency of microbursts has exceeded the respective threshold, SID, DID, and VMID associated with each time the threshold is exceeded.

A fundamental assumption here is that switch buffering capability and network propagation delays are tending to zero. In reality, however, there are a certain number of buffers on the switch ports and there are variable network delays. To factor in this reality, in one approach, only when the microburst counter increases above a threshold do we declare the port as excessively prone to microburst and then take quarantine action on it.

In summary, an FC or FCoE switch includes FC/FCoE ports to communicate with, and service data transfers between, end devices in an FC storage area network (SAN). The switch receives at an IO port a time ordered sequence of IO requests that forecast respective data transfers to be serviced by the IO port. Each IO request respectively includes a data length of the data transfer, and identifiers of a source device and a destination device for the data transfer. Based on the data length, link speed, link encoding, protocol overhead and other factors, the amount of time necessary to transfer the entire IO operation is determined (i.e., the time required to transfer the entire data length specified in the IO request over the IO port). Then, upon receiving the next read IO request, the switch checks for a microburst (i.e., a microburst event) on the IO port. To detect a microburst, the switch, determines if the time interval between the current IO request and the previous IO request is less time than it would take to transfer the entire previous data length specified in the previous IO request. The FC switch computes a frequency of the microbursts detected on the IO port, and determines whether the frequency exceeds a threshold. If the threshold is exceeded, the FC switch takes action to reduce an impact of the (microburst causing) port on the storage area network. That is, the FC switch takes action with respect to the (microburst causing) port to reduce the impact of the microbursts on that port on storage area network. In an example, the action taken may include applying a Congestion Isolation technique to the port and/or reducing future occurrences of microbursts on the port.

Thus, embodiments presented herein determine an instantaneous and continuous calculation of the time interval between two consecutive IO requests, the amount of the data that each IO generates, and how quickly a port can drain that amount of data to predict occurrences of microbursts in a FC/FCoE SAN. Through this real-time network traffic analysis feature, potential IO microbursts can be detected and the SAN network re-architected or the application settings on a server tuned to smooth its IO behavior to avoid future microbursts. This way the SAN is better equipped to meet the ever increasing storage demands of next-generation applications.

In one form, a method is provided comprising: at an FC or FCoE switch having ports to forward IO requests, and service data transfers, between end devices in a storage area network: receiving at a port a time ordered sequence of IO requests for data transfers to be serviced by the port, each IO request including a data length of the data transfer; detecting a microburst on the port for each IO request, the detecting including: parsing the IO request to retrieve the data length; determining a transfer time required to transfer the data length over the port; upon receiving a next IO request, determining whether a time interval between the IO request and the next IO request is less than the transfer time; and if the time interval is less than the transfer time, declaring that a microburst is detected on the port, otherwise not declaring that a microburst is detected on the port; computing a frequency of the microbursts detected on the port over time; and when the frequency exceeds a threshold, taking action to reduce an impact of the (microburst causing) port on the storage area network. For example, taking action with respect to the port to reduce the impact of the microbursts on the storage area network. The taking action may include taking action to reduce, or that reduces, the occurrence of microbursts on the port.

In another form, an apparatus is provided comprising: multiple FC or FCoE switch ports to forward IO requests, and service data transfers, between end devices in a storage area network; and a processor coupled to the ports and configured to: receive from a port a time ordered sequence of IO requests for data transfers to be serviced by the port, each IO request including a data length of the data transfer; detect a microburst on the port for each IO request, by: parsing the IO request to retrieve the data length; determining a transfer time required to transfer the data length over the port; upon receiving a next IO request, determining whether a time interval between the IO request and the next IO request is less than the transfer time; and if the time interval is less than the transfer time, declaring that a microburst is detected on the port, otherwise not declaring that a microburst is detected on the port; compute a frequency of the microbursts detected on the port over time; and when the frequency exceeds a threshold, take action to reduce an impact of the (microburst causing) port on the storage area network. For example, take action with respect to the port to reduce the impact of the microbursts on the storage area network. In an example, the action taken may reduce the occurrence of microbursts on the port.

In yet another form, computer readable media is provided. The computer readable media is encoded with instructions, that when executed by a processor of an FC or FCoE switch having ports to forward Input-Output IO requests, and service data transfers, between end devices in a storage area network, cause the processor to perform: receiving at a port a time ordered sequence of IO requests for data transfers to be serviced by the port, each IO request including a data length of the data transfer; detecting a microburst on the port for each IO request, the detecting including: parsing the IO request to retrieve the data length; determining a transfer time required to transfer the data length over the port; upon receiving a next IO request, determining whether a time interval between the IO request and the next IO request is less than the transfer time; and if the time interval is less than the transfer time, declaring that a microburst is detected on the port, otherwise not declaring that a microburst is detected on the port; computing a frequency of the microbursts detected on the port over time; and when the frequency exceeds a threshold, take action to reduce taking action to reduce an impact of the (microburst causing) port on the storage area network. For example, taking action with respect to the port to reduce the impact of the microbursts on the storage area network. In an example, the action taken may reduce the occurrence of microbursts on the port.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    at a Fibre Channel (FC) or FC-over-Ethernet (FCoE) switch having ports to forward Input-Output (IO) requests, and service data transfers, between end devices in a storage area network:
    receiving at a port among the ports a time ordered sequence of IO requests for data transfers to be serviced by the port, each IO request including a data length of a data transfer;
    detecting a microburst on the port for each IO request, the detecting including:
        parsing the IO request to retrieve the data length;
        determining a transfer time required to transfer the data length over the port;
        upon receiving a next IO request, determining whether a time interval between the IO request and the next IO request is less than the transfer time; and
        if the time interval is less than the transfer time, declaring that a microburst is detected on the port, otherwise not declaring that a microburst is detected;
    computing a frequency of the microbursts detected on the port over time; and
    when the frequency exceeds a threshold, taking action to reduce an impact of the port on the storage area network.

2. The method of claim 1, further comprising detecting the microburst on the port for each IO request in advance of actually transferring data for the data transfer forecasted by the IO request.

3. The method of claim 1, further comprising:
    upon receiving each IO request, time stamping the IO request with an incrementally increasing current time; and
    computing the time interval as a time interval between respective time stamps of the IO request and the next IO request.

4. The method of claim 3, wherein the time stamping includes time stamping with a sub-millisecond resolution, and the computing includes computing the time interval with the sub-millisecond resolution.

5. The method of claim 1, wherein the determining the transfer time includes determining the transfer time based on the data length and a data rate of the port.

6. The method of claim 5, wherein the determining the transfer time includes:
    converting the data length to a second data length based on a frame format defined in accordance with an FC or (FCoE) protocol; and
    computing the transfer time based on the second data length and the data rate of the port.

7. The method of claim 1, wherein the computing the frequency includes computing the frequency based on a number of microbursts detected during a given time period.

8. The method of claim 1, wherein:
the end devices include a storage array and a server configured to communicate with each other via the FC or FCoE switch in accordance with a Fibre Channel based protocol;
the receiving includes receiving the IO requests as Small Computer System Interface (SCSI) IO requests, including IO read requests and IO write request sent by the server to the storage array, and IO transfer ready messages sent by the storage array to the server responsive to the IO write requests; and
the parsing includes parsing each IO read request, IO write request, and transfer ready message to retrieve respectively the data length.

9. The method of claim 1, wherein the receiving further includes:
receiving at each of the ports a respective time ordered sequence of IO requests for respective data transfers to be serviced by each port, each IO request respectively including indications of a respective data length of the respective data transfer; and
computing a respective frequency of the microbursts detected on each port;
determining whether the respective frequency exceeds a respective threshold on each port; and
if the respective threshold is exceeded, taking action to reduce an impact of each port on which the frequency is exceeded on the storage area network.

10. The method of claim 1, wherein the taking action includes:
parsing the IO request to retrieve identifiers of source and destination devices for the IO requests;
identifying an end device among the end devices that originated the IO requests that caused the frequency to exceed the threshold based on the identifiers; and
taking action with respect to the identified end device to reduce a likelihood that the identified end device will cause future microbursts.

11. The method of claim 10, wherein the taking action further includes:
sending an alert message to an administrator portal indicating the threshold was exceeded and the identified end device that caused the frequency to exceed the threshold.

12. The method of claim 10, wherein the taking action further includes:
reducing a Quality of Service (QoS), from a first QoS value to a second QoS value that is less than the first QoS value, on the port with respect to IO requests originated from the identified end device.

13. The method of claim 1, wherein the taking action includes:
collecting information for the port including time intervals and data lengths over time;
deriving from the collected information trends in ingress vs. conditions causing the frequency to exceed the threshold; and
training a machine learning algorithm based on the trends to identify IO patterns on the ports that are likely to cause microburst conditions, and predict when the microburst conditions are likely to occur in the future.

14. An apparatus comprising:
multiple Fibre Channel or FC-over-Ethernet (FCoE) switch ports to forward Input-Output (IO) requests, and service data transfers, between end devices in a storage area network; and
a processor coupled to the ports and configured to:
receive from a port among the ports a time ordered sequence of IO requests for data transfers to be serviced by the port, each IO request including a data length of a data transfer;
detect a microburst on the port for each IO request, by:
parsing the IO request to retrieve the data length;
determining a transfer time required to transfer the data length over the port;
upon receiving a next IO request, determining whether a time interval between the IO request and the next IO request is less than the transfer time; and
if the time interval is less than the transfer time, declaring that a microburst is detected on the port, otherwise not declaring that a microburst is detected;
compute a frequency of the microbursts detected on the port over time; and
when the frequency exceeds a threshold, take action to reduce an impact of the port on the storage area network.

15. The apparatus of claim 14, wherein the processor is further configured to detect by detecting the microburst on the port for each IO request in advance of actually transferring data for the data transfer forecasted by the IO request.

16. The apparatus of claim 14, wherein the processor is further configured to:
upon receiving each IO request, time stamp the IO request with an incrementally increasing current time,
wherein the processor is configured to compute by computing the time interval by computing the time interval as a time interval between respective time stamps of the IO request and the next IO request.

17. The apparatus of claim 14, wherein:
the end devices include a storage array and a server configured to communicate with each other via the ports in accordance with a Fibre Channel based protocol;
the processor is configured to perform the receiving by receiving the IO requests as Small Computer System Interface (SCSI) IO requests, including IO read requests and IO write request sent by the server to the storage array, and IO transfer ready messages sent by the storage array to the server responsive to the IO write requests; and
the processor is configure to perform the parsing by parsing each IO read request, IO write request, and transfer ready message to retrieve respectively the data length.

18. A non-transitory computer readable medium encoded with instructions that, when executed by a processor of a Fibre Channel (FC) or FC-over-Ethernet (FCoE) switch having ports to forward Input-Output (IO) requests, and service data transfers, between end devices in a storage area network, cause the process or perform:
receiving at a port among the ports a time ordered sequence of IO requests for data transfers to be serviced by the port, each IO request including a data length of a data transfer;
detecting a microburst on the port for each IO request, the detecting including:
parsing the IO request to retrieve the data length;
determining a transfer time required to transfer the data length over the port;

upon receiving a next IO request, determining whether a time interval between the IO request and the next IO request is less than the transfer time; and if the time interval is less than the transfer time, declaring that a microburst is detected on the port; otherwise not declaring that a microburst is detected;

computing a frequency of the microbursts detected on the port over time; and when the frequency exceeds a threshold, taking action to reduce an impact of the port on the storage area network.

19. The non-transitory computer readable medium of claim 18, further comprising instructions to cause the processor to perform detecting the microburst on the port for each IO request in advance of actually transferring data for the data transfer forecasted by the IO request.

20. The non-transitory computer readable medium of claim 18, further comprising instructions to cause the processor to perform:

upon receiving each IO request, time stamping the IO request with an incrementally increasing current time; and computing the time interval as a time interval between respective time stamps of the IO request and the next IO request.

* * * * *